United States Patent
Ohta

(10) Patent No.: US 11,231,604 B2
(45) Date of Patent: Jan. 25, 2022

(54) MANUFACTURING APPARATUS AND MANUFACTURING METHOD OF LIQUID CRYSTAL DEVICE

(71) Applicant: JVCKENWOOD Corporation, Yokohama (JP)

(72) Inventor: Shinji Ohta, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 51 days.

(21) Appl. No.: 16/782,640

(22) Filed: Feb. 5, 2020

(65) Prior Publication Data
US 2020/0264457 A1  Aug. 20, 2020

(30) Foreign Application Priority Data

Feb. 20, 2019 (JP) .................................. 2019-028031
Feb. 20, 2019 (JP) .............................. JP2019-028035

(51) Int. Cl.
*G02F 1/13* (2006.01)

(52) U.S. Cl.
CPC ................................. *G02F 1/1303* (2013.01)

(58) Field of Classification Search
CPC ..... G02F 1/1303; G02F 1/1339; B32B 41/00; B32B 38/0036; B32B 2457/202; H01L 27/3232
See application file for complete search history.

(56) References Cited

U.S. PATENT DOCUMENTS

| | | | |
|---|---|---|---|
| 2005/0115499 A1* | 6/2005 | Lee ........................ | G02F 1/1339 118/642 |
| 2006/0043318 A1* | 3/2006 | Kodera ................. | G02F 1/1339 250/504 R |
| 2006/0201424 A1* | 9/2006 | Hashizume ........... | G02F 1/1339 118/712 |
| 2013/0295337 A1* | 11/2013 | Busman ................ | G02F 1/1303 428/174 |

FOREIGN PATENT DOCUMENTS

JP           2001-91931 A        4/2001

* cited by examiner

*Primary Examiner* — George R Koch
(74) *Attorney, Agent, or Firm* — Nath, Goldberg & Meyer; Jerald L. Meyer

(57) ABSTRACT

A manufacturing apparatus of a liquid crystal device includes a chamber, a stage, a plate holding unit, a driver, and a controller. The stage is housed inside the chamber and holds a plurality of first substrates. The plate holding unit is housed inside the chamber and holds a plurality of second substrates. The driver drives the stage or the plate holding unit. In a state in which a third substrate is held on the plurality of the second substrates, or in a state in which the third substrate and one of a light shielding mask and a light reduction mask are held on the plurality of the second substrates, the controller controls the driver to manufacture a plurality of the liquid crystal devices by bonding together the plurality of the first substrates and the plurality of the second substrates.

6 Claims, 5 Drawing Sheets

MANUFACTURING APPARATUS AND MANUFACTURING METHOD OF LIQUID CRYSTAL DEVICE

CROSS REFERENCE TO RELATED APPLICATION

This application is based upon and claims the benefit of priority under 35 U.S.C. § 119 from Japanese Patent Application No. 2019-028031 filed on Feb. 20, 2019, and Japanese Patent Application No. 2019-028035 filed on Feb. 20, 2019, the entire contents of both of which are incorporated herein by reference.

BACKGROUND

The present disclosure relates to a manufacturing apparatus and a manufacturing method of a liquid crystal device.

A liquid crystal device is used in display devices, optical switching devices, and the like. The liquid crystal device performs optical modulation of an irradiated light for each pixel to generate an image light, or adjusts the refractive index of a liquid crystal to change the wavefront of the signal light. Japanese Unexamined Patent Application Publication No. 2001-91931 discloses an example of a manufacturing method of the liquid crystal device.

SUMMARY

A batch bonding method is known in which a semiconductor substrate and a glass substrate are bonded together to obtain one structure, and this structure is then cut into units of liquid crystal devices to manufacture a plurality of liquid crystal devices at one time. In the batch bonding method, however, if a defective region exists in the semiconductor substrate, the liquid crystal device manufactured from this defective region is a defective product. That is, in the batch bonding method, if there is a defective region on the semiconductor substrate, a defective liquid crystal device is also produced.

In another method, a semiconductor substrate is cut into pieces and a good drive substrate can be selected among the cut pieces, a glass substrate can be cut to obtain a counter substrate, and the good drive substrate and the counter substrate are bonded together to efficiently manufacture a good liquid crystal device.

However, in the later method, since the drive substrate and the counter substrate that have been cut in units of liquid crystal device are bonded together, compared to the batch bonding method, it is difficult to effectively bond together the drive substrate and the counter substrate so that they are parallel to each other. For this reason, the in-plane variation in a cell gap, that is a gap between the drive substrate and the counter substrate, becomes large, and this can lead to degradation of the performance of the liquid crystal device.

A first aspect of one or more embodiments provides a manufacturing apparatus of a liquid crystal device including: a chamber; a stage housed in the chamber for holding a plurality of first substrates; a plate holding unit housed in the chamber for holding a plurality of second substrates; a driver configured to drive the stage or the plate holding unit; and a controller configured to control the driver, wherein, in a state in which a third substrate is held on the plurality of the second substrates, or in a state in which the third substrate and one of a light shielding mask and a light reduction mask are held on the plurality of the second substrates, the controller controls the driver to manufacture a plurality of the liquid crystal devices by bonding together the plurality of the first substrates and the plurality of the second substrates.

A second aspect of one or more embodiments provides a manufacturing method of a liquid crystal device including: holding a plurality of first substrates in which a predetermined amount of liquid crystal is dropped and sealing material is applied on a stage in a chamber; holding a plurality of second substrates on a substrate holding plate so as to face the plurality of first substrates in the chamber; holding a third substrate on the plurality of second substrates in the chamber; after decompressing an inside of the chamber, moving the stage toward the substrate holding plate so that the first substrates and the second substrates come into contact with each other via the sealing material and the liquid crystal, and pushing upward the second substrates by the stage so that the second substrates are separated from the substrate holding plate so as to act a gravity of the third substrate on the second substrates; and after bringing the inside of the chamber into an atmospheric pressure state, irradiating light to a predetermined area of the first substrates to bond the first substrates and the second substrates, in a state in which the gravity of the third substrate acts on the second substrates.

DETAILED DESCRIPTION

Figure 1:
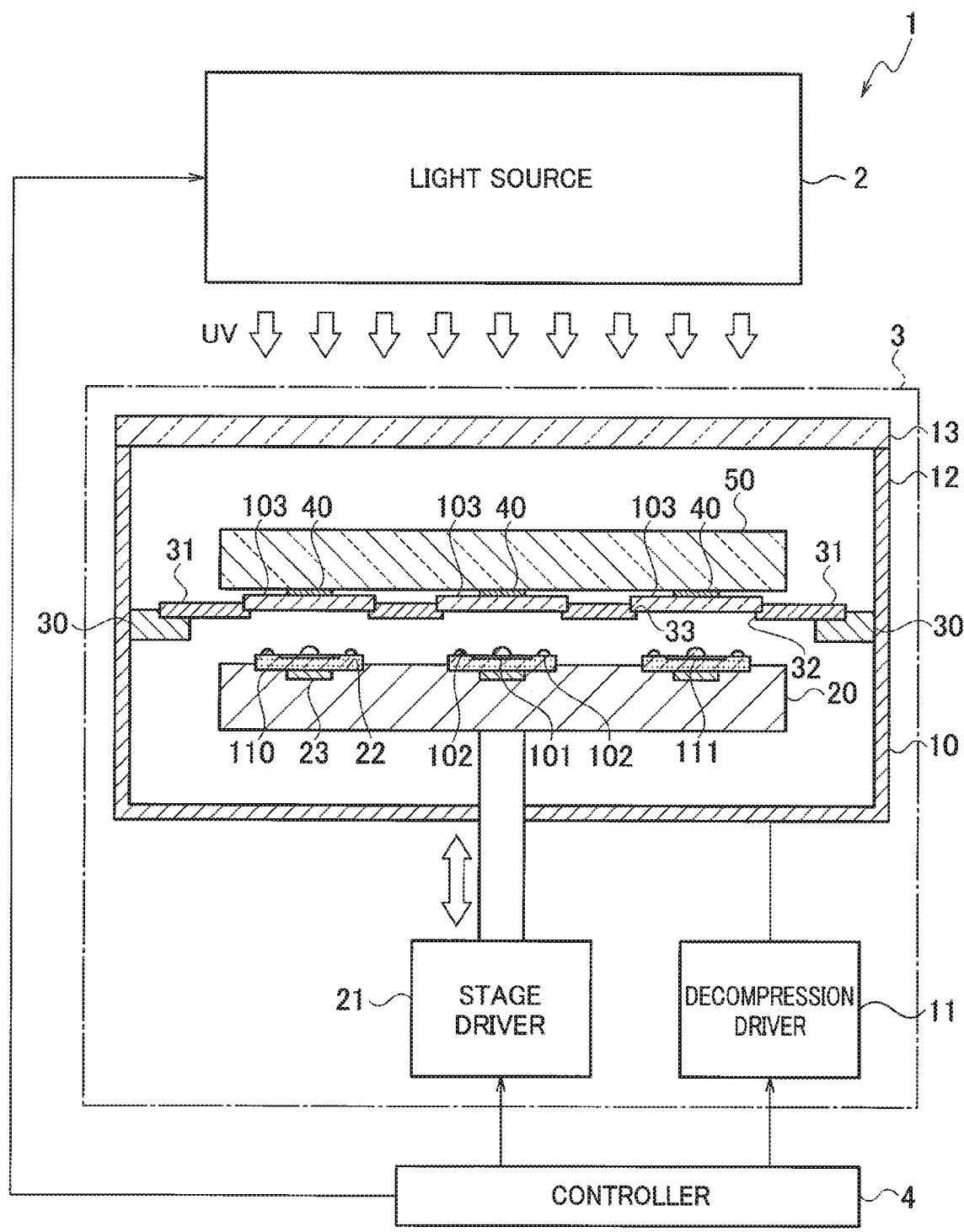
FIG. 1 is a diagram illustrating a first configuration example of a manufacturing apparatus of a liquid crystal device according to one or more embodiments.

A first configuration example of a manufacturing apparatus of a liquid crystal device according to one or more embodiments will be described below with reference to FIG. 1. Hereinafter, the manufacturing apparatus of the liquid crystal device will be simply referred to as a "manufacturing apparatus". A manufacturing apparatus 1 includes a light source 2, a substrate bonding unit 3, and a controller 4. The controller 4 controls the light source 2 and the substrate bonding unit 3 based on a pre-set program or instruction information from an operator. A computing device or a central processing unit (CPU) may be used as the controller 4.

The substrate bonding unit 3 includes a vacuum chamber 10 (hereinafter, referred to as chamber 10), a decompression driver 11, a stage 20, a stage driver 21, and a plate holding unit 30. The chamber 10 includes a chamber body 12 and a cover 13. The stage 20 and the plate holding unit 30 are housed inside the chamber 10. A vacuum pump may be used as the decompression driver 11. The cover 13 is light transmissive. Specifically, the cover 13 allows ultraviolet rays to pass therethrough. A quartz glass plate may be used as the cover 13.

The controller 4 can open and close the cover 13 by controlling the substrate bonding unit 3. The controller 4 can seal the interior of the chamber 10 by causing the cover 13 to make firm contact with the chamber body 12. Alternatively, the operator may manually open and close the cover 13. While the inside of the chamber 10 is in the sealed state, the controller 4 decompresses the inside of the chamber 10 by driving the decompression driver 11.

The stage 20 is provided with a plurality of recesses 22 that is used for positioning and holding a plurality of drive substrates 110 (first substrates). The drive substrate 110 constitutes a liquid crystal device. The drive substrates 110 are positioned by using the recesses 22 whereby the drive substrates 110 are detachably held on the stage 20. A heater 23 may be arranged at or near the bottom surface of the recess 22 formed in the stage 20. While the drive substrate 110 has been held in the recess 22, the controller 4 can heat the drive substrate 110 by driving the heater 23 so that the temperature of the drive substrate 110 is within a predetermined temperature range.

Only the drive substrates 110 that have been determined to be good by way of inspection are held on the stage 20. The drive substrate 110 includes a pixel region 111 in which many pixels are formed. A semiconductor substrate may be used as the drive substrate 110. The drive substrate 110 is held on the stage 20 in a state in which a predetermined amount of liquid crystal 101 is dropped in a central part of the pixel region 111, and sealing material 102 is applied along a peripheral part of the pixel region 111. An ultraviolet curable resin may be used as the sealing material 102.

The plate holding unit 30 is firmly fixed to the chamber body 12. The plate holding unit 30 holds a substrate holding plate 31 such that the substrate holding plate 31 is parallel to the stage 20. The substrate holding plate 31 has a plurality of openings 32 at positions facing the recesses 22 of the stage 20. The opening 32 is of a size that allows the drive substrate 110 to be inserted therethrough.

The substrate holding plate 31 has a plurality of step portions 33 formed along an inner periphery of the opening 32. These step portions 33 are used to position and hold a plurality of counter substrates 103 (second substrates). The counter substrates 103 constitutes the liquid crystal devices. The counter substrates 103 are positioned by using the step portions 33 whereby the counter substrates 103 are detachably held on the substrate holding plate 31. That is, the plate holding unit 30 holds the counter substrates 103 via the substrate holding plate 31. The counter substrate 103 is light transmissive. A glass substrate may be used as the counter substrate 103.

In a state in which the drive substrates 110 are held on the stage 20 and the substrate holding plate 31 that holds the counter substrates 103 is held on the plate holding unit 30, the drive substrates 110 and the counter substrates 103 are positioned parallel to each other and facing each other. In the state in which the substrate holding plate 31 is held by the plate holding unit 30, the controller 4 moves the stage 20 closer to or away from the substrate holding plate 31 by controlling the stage driver 21.

In a state in which the drive substrates 110 are held on the stage 20 and the substrate holding plate 31 that holds the counter substrates 103 is held on the plate holding unit 30, light shielding masks 40 are positioned corresponding to the pixel region 111 and are held on the counter substrate 103. That is, the light shielding masks 40 are held on the counter substrate 103 so as to shield the pixel region 111 of the drive substrates 110.

A transparent substrate 50 (third substrate), which is a weight member, is held on the light shielding mask 40. That is, the transparent substrate 50 is held on the counter substrates 103 via the light shielding masks 40. The manufacturing apparatus 1 may include a transport mechanism that moves or retracts the light shielding mask 40 onto the counter substrate 103, and moves or retracts the transparent substrate 50 onto the light shielding mask 40. Alternatively, such movements of the light shielding mask 40 and the transparent substrate 50 may be performed manually by the operator.

Figure 2:
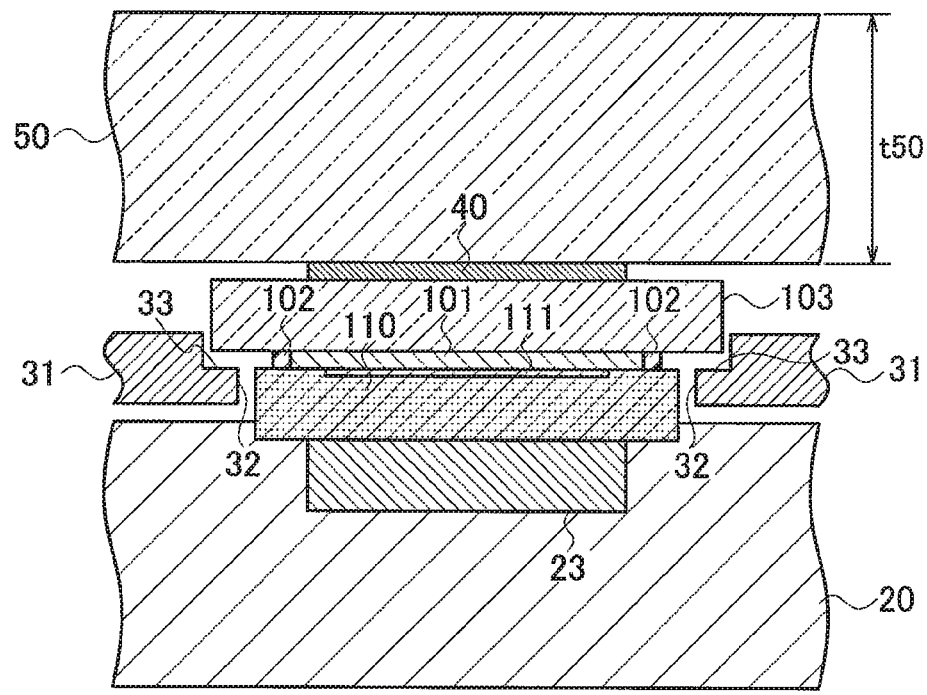
FIG. 2 is a partial cross-sectional view showing a state in which a drive substrate and a counter substrate are bonded together while applying weight by using a transparent substrate selected from among a plurality of transparent substrates having different thicknesses or weights.

As shown in FIG. 2, a plurality of the transparent substrates 50 having different thicknesses t50 or different weights may be prepared, and the transparent substrate 50 selected from among the transparent substrates 50 can be held on the light shielding mask 40. The manufacturing apparatus 1 selects the target transparent substrate 50 from among the transparent substrates 50 based on a pre-set program or instruction information from the operator. The manufacturing apparatus 1 may include a transport mechanism that moves or retracts the selected transparent substrate 50 onto the light shielding mask 40. Alternatively, such movement of the selected transparent substrate 50 may be performed manually by the operator.

Figure 3:
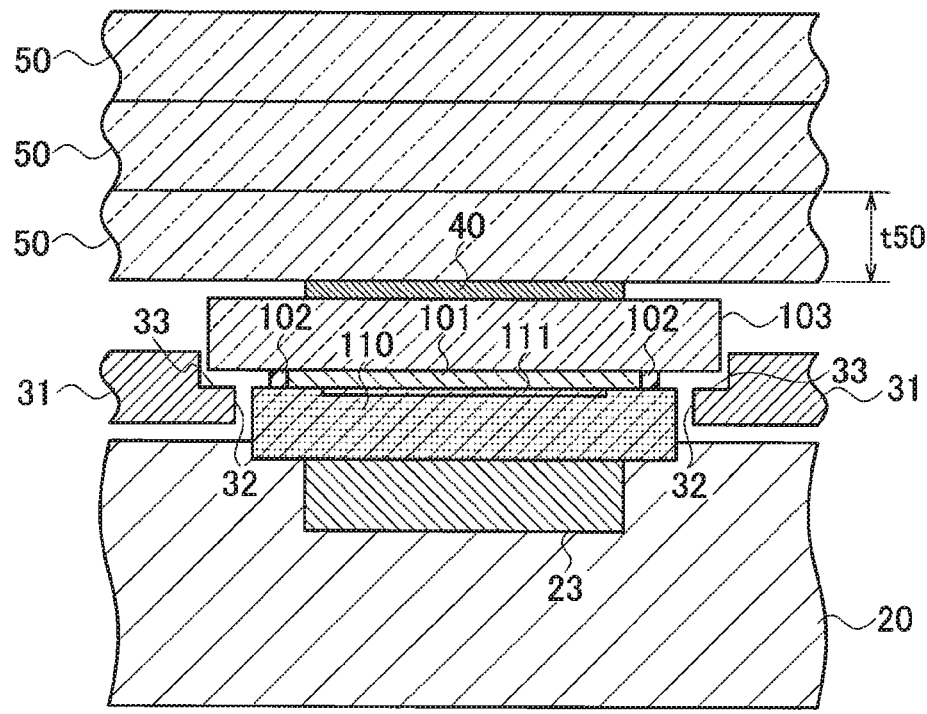
FIG. 3 is a partial cross-sectional view showing a state in which the drive substrate and the counter substrate are bonded together while applying weight by using a plurality of transparent substrates selectively combined from a plurality of transparent substrates.

As shown in FIG. 3, the plurality of the transparent substrates 50 may be prepared, and a number of the transparent substrates 50 selected from among the transparent substrates 50 may be held on the light shielding mask 40. FIG. 3 shows a state in which three transparent substrates 50 are held on the light shielding mask 40. The manufacturing apparatus 1 selects a certain number of the transparent substrates 50 from among the plurality of the transparent substrates 50 based on a pre-set program or instruction information from the operator. The manufacturing apparatus 1 may include a transport mechanism that moves or retracts the selected the transparent substrates 50 to stack them on the light shielding mask 40. Alternatively, such movement of the transparent substrates 50 may be performed manually by the operator.

As the transparent substrate 50, a transparent substrate on which the light shielding mask 40 is formed may be used. When this configuration is adopted, the transparent substrate 50 is held on the counter substrates 103 in a state in which the light shielding mask 40 is positioned corresponding to the pixel region 111. The manufacturing apparatus 1 may include a transport mechanism that moves or retracts, on the counter substrates 103, the transparent substrate 50 on which the light shielding mask 40 is formed. Alternatively, such movements of the transparent substrates 50 may be performed manually by the operator.

The transparent substrate 50 on which the light shielding mask 40 has been formed and the transparent substrate 50 on which the light shielding mask 40 is not formed may be used. When the transparent substrate 50 having the light shielding mask 40 formed thereon is used, the transparent substrate 50 is held on the counter substrates 103 such that the light shielding mask 40 is positioned corresponding to the pixel region 111. The manufacturing apparatus 1 may include a transport mechanism that moves and retracts, on the counter substrates 103, the transparent substrate 50 on which the light shielding mask 40 has been formed and the transparent substrate 50 on which the light shielding mask 40 has not been formed. Alternatively, such movement of the transparent substrates 50 may be performed manually by the operator.

Figure 4:
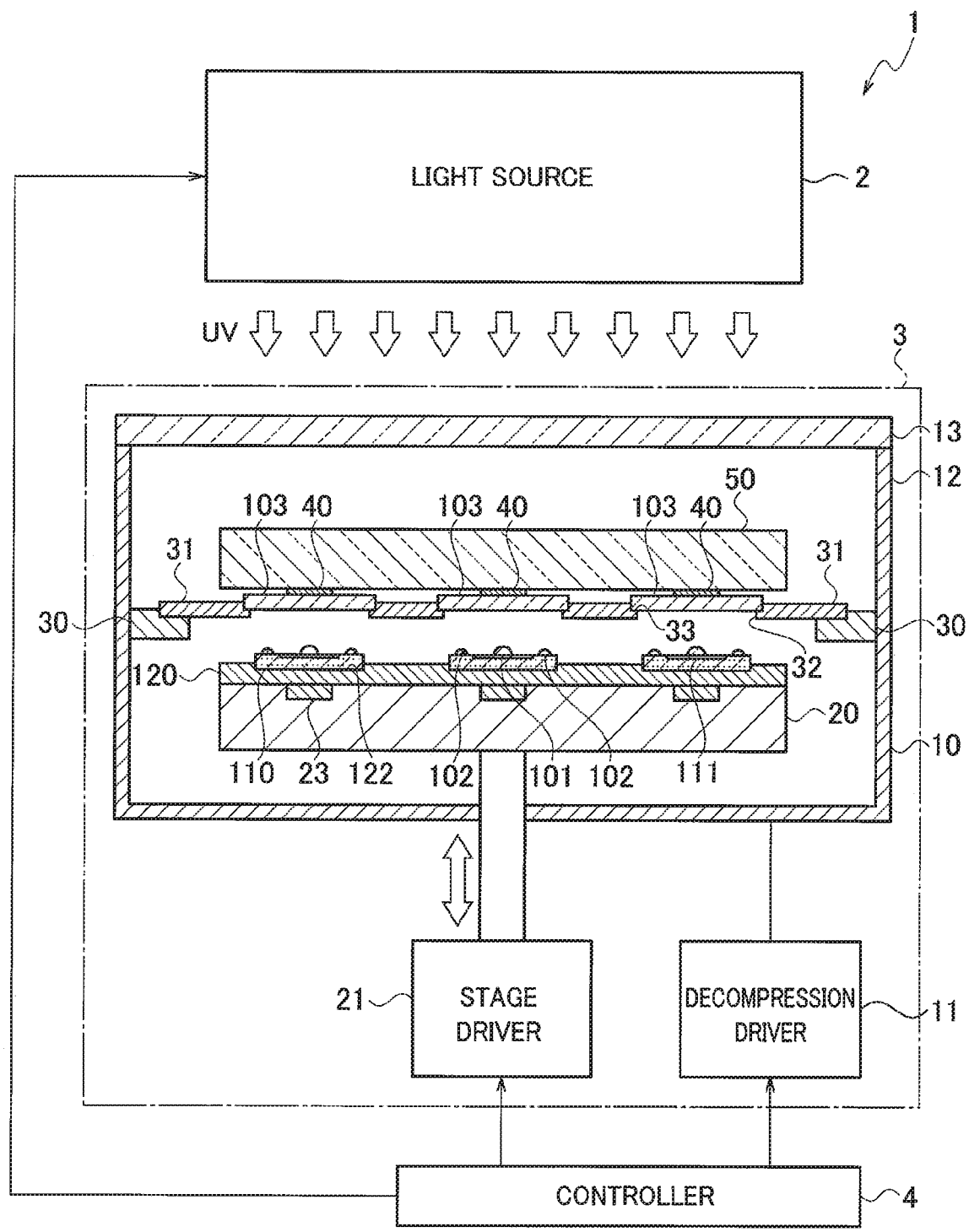
FIG. 4 is a diagram illustrating a second configuration example of the manufacturing apparatus of the liquid crystal device according to one or more embodiments.

As shown in FIG. 4, a substrate holding plate 120 having a plurality of recesses 122 that is used for positioning and holding the drive substrates 110 may be used. When such a substrate holding plate 120 is used, the substrate holding plate 120 on which the drive substrates 110 are positioned and held by the recesses 122 is positioned and held on the stage 20. That is, the stage 20 holds the drive substrate 110 via the substrate holding plate 120.

Figure 5:
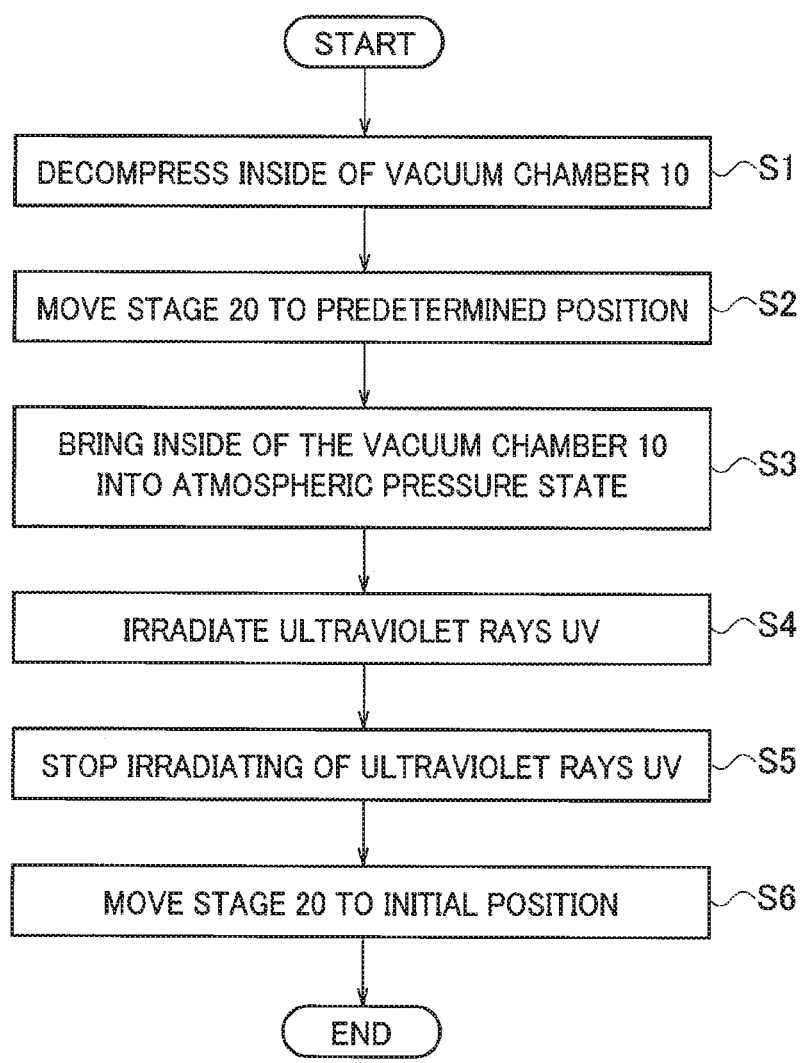
FIG. 5 is a flowchart showing an example of a manufacturing method of a liquid crystal device according to one or more embodiments.

An example of the manufacturing method of the liquid crystal device according to one or more embodiments will be described while using the flowchart shown in FIG. 5. As shown in FIG. 1, the drive substrates 110 are held in the recesses 22 of the stage 20. Alternatively, as shown in FIG. 4, the substrate holding plate 120 in which the drive substrates 110 are held in the recesses 122 is positioned and held on the stage 20.

As shown in FIG. 1 or 4, the counter substrates 103 are held by the step portions 33 of the substrate holding plate 31. The substrate holding plate 31 is held by the plate holding unit 30. The light shielding mask 40 is held on the counter substrates 103. The transparent substrates 50 having a pre-set thickness, a pre-set weight, or a pre-set number are held on the light shielding mask 40. The transparent substrate 50 and the counter substrates 103 are in surface contact via the light shielding mask 40.

While the inside of the chamber 10 in the sealed state, in step S1, the controller 4 decompresses the inside of the chamber 10 by driving the decompression driver 11. As the pressure inside the chamber 10 is reduced, in step S2, the controller 4 moves (upward in FIG. 1 or 4) the stage 20 from an initial position thereof to a predetermined position by controlling the stage driver 21 so that the drive substrates 110 and the counter substrates 103 are in contact with each other via the sealing material 102 and the liquid crystal 101.

The controller 4 may heat the drive substrates 110 by controlling the heater 23 so that the temperature thereof is within a predetermined temperature range. When the drive substrates 110 are heated, the viscosity of the liquid crystal 101 is lowered and the liquid crystal 101 is flattened. As a result, the sealing material 102 can be brought into contact with the counter substrate 103 before it contacts the liquid crystal 101.

FIG. 2 or 3 shows a state in which the drive substrate 110 and the counter substrate 103 are in contact with each other via the sealing material 102 and the liquid crystal 101. The counter substrate 103 is pushed upward by the stage 20 so that the counter substrate 103 is separated from the substrate holding plate 31. Accordingly, the gravity of the light shielding mask 40 and the transparent substrate 50 acts on the counter substrates 103. Because the gravity of the transparent substrate 50 is larger than the gravity of the light shielding mask 40, the weight on the counter substrates 103 can be changed according to the thickness, weight, or number of the transparent substrates 50. The cell gap between the drive substrate 110 and the counter substrate 103 can be adjusted by adjusting the load on the counter substrate 103.

When the transparent substrate 50 and the counter substrates 103 are in surface contact with each other via the light shielding mask 40, because the gravity of the transparent substrate 50 (the light shielding mask 40) acts on the counter substrates 103, the in-plane distribution in the cell gap can be improved in comparison to a case in which the transparent substrate 50 is not used. Also, by adjusting the weight on the counter substrates 103, the in-plane distribution in the cell gap can be improved.

In step S3, the controller 4 controls the decompression driver 11 to bring the inside of the chamber 10 into the atmospheric pressure state. Instead of the controller 4 controlling the decompression driver 11 to make the inside of the chamber 10 in the atmospheric pressure state, this work may be manually perform by the operator.

While the inside of the chamber 10 is in the atmospheric pressure state and the gravity of the transparent substrate 50 (the light shielding mask 40) acts on the counter substrates 103, in step S4, the controller 4 controls the light source 2 so that a light having a predetermined wavelength band (for example, ultraviolet UV) is output from the light source 2 toward the substrate bonding unit 3 (specifically, toward the cover 13). The ultraviolet rays UV pass through the cover 13, the transparent substrate 50, and the counter substrates 103, and irradiate the sealing material 102. Since the pixel region 111 of the drive substrate 110 is shielded by the light shielding mask 40, the ultraviolet rays UV are not irradiated on the pixel region 111.

Since the sealing material 102 is cured by ultraviolet rays UV, by employing the transparent substrate 50, the manufacturing apparatus 1 is able to bond the drive substrates 110 and the counter substrates 103 together with the sealing material 102 at the targeted cell gap and in a state in which the cell gap is adjusted to the targeted in-plane distribution. The liquid crystal 101 is filled in the gap between the drive substrate 110 and the counter substrate 103 and sealed with the sealing material 102. As a result, a plurality of liquid crystal devices is manufactured simultaneously.

In step S5, the controller 4 controls the light source 2 so as to stop outputting the ultraviolet rays UV. Further, the controller 4 opens the cover 13 by controlling the substrate bonding unit 3. Alternatively, the cover 13 may be opened manually by the operator. After the operator takes out the transparent substrate 50, the light shielding mask 40, and the liquid crystal devices from the chamber 10, the controller 4 moves (downward in FIG. 1 or 4) the stage 20 from the current predetermined position to the initial position. Then, the manufacturing apparatus 1 completes the process of bonding the drive substrates 110 and the counter substrates 103. Note that, the operator may manually perform one or more of the entire of a part of steps S1 to S6.

In accordance with the manufacturing apparatus and the manufacturing method of the liquid crystal device according to one or more embodiments, by performing steps S1 to S6, the drive substrates 110 and the counter substrates 103 are bonded together by the sealing material 102, the liquid crystal 101 is filled in the gap between the drive substrate 110 and the counter substrate 103 and sealed with the sealing material 102. As a result, a plurality of the liquid crystal devices having the targeted cell gap that is adjusted to the targeted in-plane distribution can be manufactured. Therefore, according to the manufacturing apparatus and manufacturing method of the liquid crystal device according to one or more embodiments, a plurality of the liquid crystal devices can be manufactured simultaneously by parallelly bonding the plurality of the drive substrates 110 and the plurality of the counter substrates 103.

Figure 6:
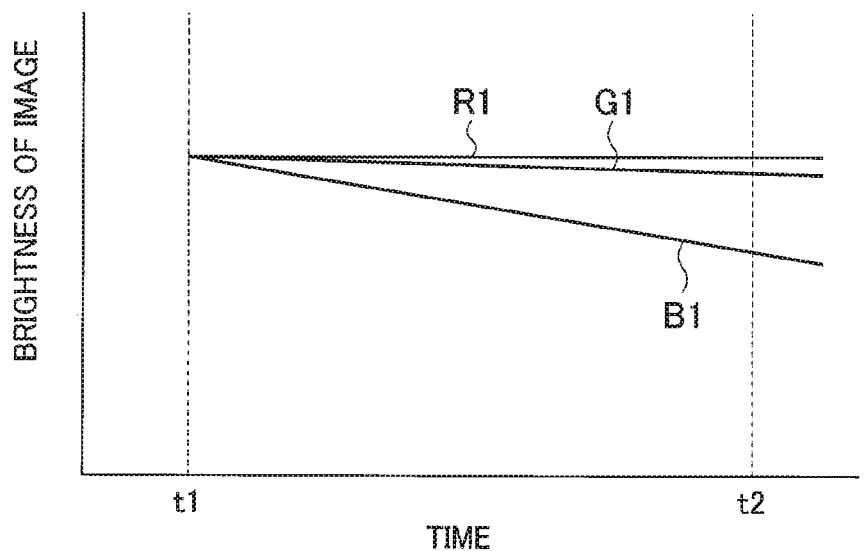
FIG. 6 is a diagram illustrating a first example of a temporal change in image brightness.
Figure 7:
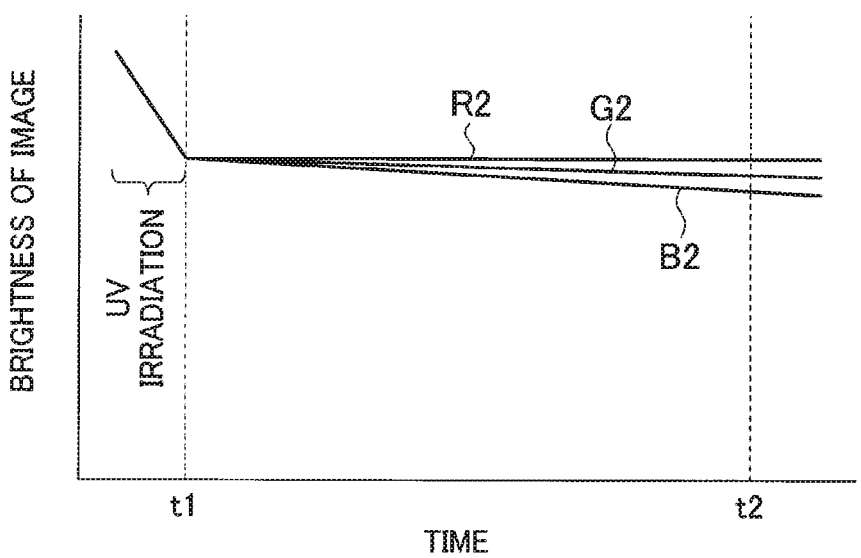
FIG. 7 is a diagram illustrating a second example of a temporal change in image brightness.

When the liquid crystal device is used for a display device, the liquid crystal device generates image light by modulating the output irradiation light for each pixel. The display device displays an image by projecting the image light onto a screen or the like. FIGS. 6 and 7 show first and second examples of a temporal change of brightness of the image, respectively.

The lines indicated by reference symbols R1 and R2 in FIGS. 6 and 7 show examples of the temporal change of the brightness of an image (red image) when red irradiation light is irradiated on the liquid crystal device (liquid crystal device for red). The lines indicated by reference symbols G1 and G2 show examples of the temporal change in the brightness of an image (green image) when green irradiation light is irradiated on the liquid crystal device (liquid crystal device for green). The lines indicated by reference symbols B1 and B2 show an example of the temporal change in the brightness of an image (blue image) when blue irradiation light is irradiated on the liquid crystal device (liquid crystal device for blue).

FIG. 6 shows an example of the temporal change of the brightness R1, G1, and B1 of the red image, the green image, and the blue image when the light shielding mask 40 is used when manufacturing the liquid crystal device for red, the liquid crystal device for green, and the liquid crystal device for blue. At a time point t1 (for example, at the time of shipment), the liquid crystal device for red, the liquid crystal device for green, and the liquid crystal device for blue have been adjusted so that the brightness of the red image, the green image, and the blue image is the same. Generally, at a time point t2, which is after a predetermined time has elapsed from the time t1, the brightness B1 of the blue image is darker than the brightness R1 of the red image and the brightness G1 of the green image. Therefore, at the time point t2, white balance of the image degrades as compared to the same at the time point t1.

FIG. 7 shows an example of a temporal change of the brightness R2, G2, and B2 of the red image, the green images, and the blue image when the light shielding mask 40 is used when manufacturing the liquid crystal device for red and the liquid crystal device for green, and when the light shielding mask 40 is not used when manufacturing the liquid crystal device for blue.

When manufacturing the liquid crystal device for blue, the brightness B2 of the blue image can be stabilized over time by irradiating the liquid crystal 101 on the pixel region 111 with ultraviolet rays UV in step S4. At the time point t1 (for example, at the time of shipment), the liquid crystal device for red, the liquid crystal device for green, and the liquid crystal device for blue are adjusted so that the brightness of the red image, the green image, and the blue image is the same. Because the brightness B2 of the blue image is stable over time, the variation due to the temporal change in the brightness R2 of the red image, the brightness G2 of the green image, and the brightness B2 of the blue image at the time point t2 can be reduced. As a result, it is possible to suppress the degradation of the white balance of the image at the time point t2.

The present invention is not limited to the above-described one or more embodiments, and various modifications can be made without departing from the scope of the present invention.

As an embodiment, the case in which the stage 20 is driven and the plate holding unit 30 that holds the substrate holding plate 31 is fixed to the chamber body 12 has been described. Alternatively, the plate holding unit 30 that holds the substrate holding plate 31 can be driven and the stage 20 can be fixed to the chamber body 12. When the later configuration is adopted, the manufacturing apparatus 1 is provided with a plate driver instead of the stage driver 21, and the controller 4 controls the plate driver to bring the plate holding unit 30 closer to or away from the stage 20. The stage driver 21 or the plate driver is simply used as the driver.

The light shielding mask 40 may be used when manufacturing the liquid crystal device for red and the liquid crystal device for green, and a light reduction mask may be used when manufacturing the liquid crystal device for blue. When the above configuration is adopted, the light reduction mask is positioned corresponding to the pixel region 111 of the drive substrate 110 and held on the counter substrate 103. Depending on the transmittance of the light reduction mask, the amount or intensity of the ultraviolet rays UV irradiated on the liquid crystal 101 on the pixel region 111 can be set. By appropriately setting the transmittance of the light reduction mask, the brightness B2 of the blue image can be stabilized over time.

What is claimed is:

1. A manufacturing apparatus of liquid crystal devices for red, green, and blue comprising:
   a chamber;
   a stage housed in the chamber for holding a plurality of first substrates;
   a plate holding unit housed in the chamber for holding a plurality of second substrates;
   a driver configured to drive the stage or the plate holding unit; and
   a controller configured to control the driver,
   wherein, when manufacturing a plurality of the liquid crystal devices for red or green, in a state in which a third substrate and a light shielding mask are held on the plurality of the second substrates, the controller controls the driver to manufacture the plurality of the liquid crystal devices for red or green by bonding together the plurality of the first substrates and the plurality of the second substrates,
   and wherein, when manufacturing a plurality of the liquid crystal devices for blue, in a state in which the third substrate and a light reduction mask are held on the plurality of the second substrates, the controller controls the driver to manufacture the plurality of the liquid crystal devices for blue by bonding together the plurality of the first substrates and the plurality of the second substrates.

2. The manufacturing apparatus of liquid crystal devices for red, green, and blue according to claim 1, further comprising a decompression driver configured to decompress inside of the chamber,
   wherein the controller controls the decompression driver to bring the inside of the chamber into a decompressed state.

3. The manufacturing apparatus of liquid crystal devices for red, green, and blue according to claim 2, further comprising a light source,
   wherein the controller controls the decompression driver to change the inside of the chamber from a reduced pressure state to an atmospheric pressure state, and controls the light source to irradiate the predetermined region of the plurality of the first substrates.

4. The manufacturing apparatus of liquid crystal devices for red, green, and blue according to claim 3,
   wherein the chamber comprises a chamber body and a cover,
   the cover, the second substrates, and the third substrates have optical transparency,
   the light source irradiates a predetermined region of the plurality of first substrates through the cover and the second substrates and the third substrate.

5. The manufacturing apparatus of liquid crystal devices for red, green, and blue according to claim 1, further comprising a heater configured to heat the first substrate.

6. A manufacturing method of liquid crystal devices for red, green, and blue comprising:
- holding a plurality of first substrates in which a predetermined amount of liquid crystal is dropped and sealing material is applied on a stage in a chamber;
- holding a plurality of second substrates on a substrate holding plate so as to face the plurality of first substrates in the chamber;
- when manufacturing a plurality of the liquid crystal devices for red or green, holding light shielding masks on the second substrates in the chamber, and when manufacturing a plurality of the liquid crystal devices for blue, holding light reduction masks on the second substrates in the chamber;
- holding a third substrate on the plurality of second substrates via the light shielding masks or the light reduction masks in the chamber;
- after decompressing an inside of the chamber, moving the stage toward the substrate holding plate so that the first substrates and the second substrates come into contact with each other via the sealing material and the liquid crystal, and pushing upward the second substrates by the stage so that the second substrates are separated from the substrate holding plate so as to act a gravity of the third substrate on the second substrates; and
- after bringing the inside of the chamber into an atmospheric pressure state, irradiating light to a predetermined area of the first substrates to bond the first substrates and the second substrates, in a state in which the gravity of the third substrate acts on the second substrates.

* * * * *